(12) United States Patent
Dong

(10) Patent No.: US 11,243,374 B2
(45) Date of Patent: Feb. 8, 2022

(54) PROJECTION DEVICE

(71) Applicant: HISENSE LASER DISPLAY CO., LTD., Qingdao (CN)

(72) Inventor: Shubin Dong, Qingdao (CN)

(73) Assignee: HISENSE LASER DISPLAY CO., LTD., Qingdao (CN)

( * ) Notice: Subject to any disclaimer, the term of this patent is extended or adjusted under 35 U.S.C. 154(b) by 0 days.

(21) Appl. No.: 16/813,575

(22) Filed: Mar. 9, 2020

(65) Prior Publication Data

US 2020/0225440 A1 Jul. 16, 2020

Related U.S. Application Data

(63) Continuation of application No. PCT/CN2019/082996, filed on Apr. 17, 2019.

(30) Foreign Application Priority Data

Jun. 19, 2018 (CN) .......................... 201810631711.7
Jun. 19, 2018 (CN) .......................... 201810632103.8

(51) Int. Cl.
*G02B 7/02* (2021.01)
*G03B 21/16* (2006.01)
(Continued)

(52) U.S. Cl.
CPC ............. *G02B 7/028* (2013.01); *G03B 21/16* (2013.01); *H04N 9/3144* (2013.01); *G03B 21/008* (2013.01)

(58) Field of Classification Search
CPC ...... G03B 21/16; H04N 9/3144; G02B 7/028; G02B 13/16
See application file for complete search history.

(56) References Cited

U.S. PATENT DOCUMENTS

2006/0067678 A1 3/2006 Senba et al.
2007/0091278 A1 4/2007 Zakoji et al.
2010/0097579 A1* 4/2010 Hsieh ..................... G02B 7/028
353/52

FOREIGN PATENT DOCUMENTS

CN 101630115 A 1/2010
CN 101726819 A 6/2010
(Continued)

OTHER PUBLICATIONS

Notice of Allowance of the priority Chinese application.
(Continued)

*Primary Examiner* — Ryan D Howard
(74) *Attorney, Agent, or Firm* — J.C. Patents

(57) ABSTRACT

The present application provides a projection device. The projection device of the present application includes a lens barrel and a thermal transfer assembly disposed on an outer wall of the lens barrel; the thermal transfer assembly includes a first thermal transfer structure and a second thermal transfer structure, the first thermal transfer structure is disposed on the outer wall of the lens barrel and extends along an axial direction of the lens barrel, one end of the second thermal transfer structure is disposed at one end of the first thermal transfer structure, and the other end of the second thermal transfer structure extends away from the axial direction of the lens barrel. The application can effectively dissipate thermal when the lens assembly is working.

20 Claims, 10 Drawing Sheets

(51) Int. Cl.
*H04N 9/31* (2006.01)
*G03B 21/00* (2006.01)

(56) References Cited

FOREIGN PATENT DOCUMENTS

| | | |
|---|---|---|
| CN | 105182670 A | 12/2015 |
| CN | 206684477 U | 11/2017 |
| CN | 108681194 A | 10/2018 |
| CN | 108803208 A | 11/2018 |
| CN | 108828883 A | 11/2018 |
| CN | 108873579 A | 11/2018 |
| JP | H10-161242 A | 6/1998 |
| JP | 2005128217 A | 5/2005 |
| JP | 2008-058654 A | 3/2008 |
| JP | 2014062935 A | 4/2014 |

OTHER PUBLICATIONS

The International Search Report of corresponding International application No. PCT/CN2019/082996, dated Jul. 19, 2019.
The Chinese First Examination Report and Search Report of corresponding Chinese application No. 201810631711.7, dated Oct. 9, 2019.
The Chinese First Examination Report and Search Report of corresponding Chinese application No. 201810632103.8, dated Oct. 9, 2019.

* cited by examiner

PROJECTION DEVICE

CROSS-REFERENCE TO RELATED APPLICATION

This application is a continuation of the International Application No. PCT/CN2019/082996, filed on Apr. 17, 2019, which claims the benefit of priority to Chinese Patent Applications with Application No. 201810631711.7, entitled "Projection Device", filed to the Chinese Patent Office on Jun. 19, 2018, and Application No. 201101832103.8, entitled "Projection Device", filed to the Chinese Patent Office on Jun. 19, 2018, and the entire contents of the three are hereby incorporated by reference in this application.

TECHNICAL FIELD

The present application relates to the field of projection display technologies, and in particular, to a projection device.

BACKGROUND

With the development of science and technology, various types of projection device such as laser TVs and projectors have been more and more widely used due to their advantages of larger size and better display effect of projected image.

At present, a projection device is mainly composed of an optical assembly, a lens assembly, and the like. In some implementations, the optical assembly may include a Digital Micro-mirror Device (DMD) and the like, and the lens assembly typically includes a lens barrel and multiple sets of lenses. The lens barrel may be made of a material such as plastic, and one end of the lens assembly is connected to the optical assembly for receiving light emitted from the DMD element, and the other end of the lens assembly is for emitting light directly to a projection screen or emitting light to the projection screen via a speculum. Multiple sets of lenses are installed in the lens barrel, to refract the light emitted from the optical assembly so that it can be emitted from the other end of the lens barrel for imaging.

SUMMARY

The present application provides a projection device capable of effectively dissipating thermal while the lens assembly is working.

In one aspect, the present application provides a projection device including a lens barrel and a thermal transfer assembly disposed on an outer wall of the lens barrel; the thermal transfer assembly includes a first thermal transfer structure and a second thermal transfer structure, the first thermal transfer structure is disposed on the outer wall of the lens barrel and extends along an axial direction of the lens barrel, one end of the second thermal transfer structure is disposed at one end of the first thermal transfer structure, the other end of the second thermal transfer structure extends in a direction away from the axial direction of the lens barrel.

In another aspect, the present application provides a projection device, including:

a front group lens barrel and a rear group lens barrel which are disposed along a same axis, the front group lens barrel and the rear group lens barrel being configured to be relatively movable along a direction in which the axis extends;

a first housing provided with a digital micro-mirror device inside; a first through hole is disposed on the first housing, and one end of the rear group lens barrel is configured to go deep into the first housing via the first through hole;

a lens base disposed at the outer side of the front group lens barrel and a first thermal dissipating assembly sleeved and disposed at the outer side of the front group lens barrel, the lens base and the front group lens barrel are mutually fixed, the lens base is configured to fix the front group lens barrel on the first housing, the lens base defines a groove toward one side of the first housing, and the first thermal dissipating assembly is disposed in the groove; and a thermal transfer assembly including a first connecting portion in a cylinder shape, a second connecting portion in an annular shape, a first bending portion and an abutting portion, the first connecting portion is disposed on an outer wall of the rear group lens barrel and extends along an axial direction of the rear group lens barrel, the second connecting portion is disposed at one end of the first connecting portion near the lens base and extends along a radial direction of the lens barrel, one end of the first bending portion is connected to one end of the second connecting portion toward the first thermal dissipating assembly, and the abutting portion is disposed at one end of the first bending portion away from the first connecting portion, the abutting portion is configured to abut with the first thermal dissipating assembly, and one end of the first bending portion away from one end of the first connecting portion is bending toward the first thermal dissipating assembly, so that a preset distance exists between a plane in which the abutting portion is located and one end of the first bending portion that connects the second connecting portion.

BRIEF DESCRIPTION OF DRAWINGS

In order to illustrate the technical solutions in embodiments of the present application or in the prior art more clearly, the drawings needed to be used in the description of the embodiments or the prior art will be briefly described below. Obviously, the drawings in the following description are some embodiments of the present application, and other drawings may be obtained according to these drawings without any creative effort for those skilled in the art. In different drawings, the same reference numbers represent the same or similar elements.

DESCRIPTION OF EMBODIMENTS

Figure 1:
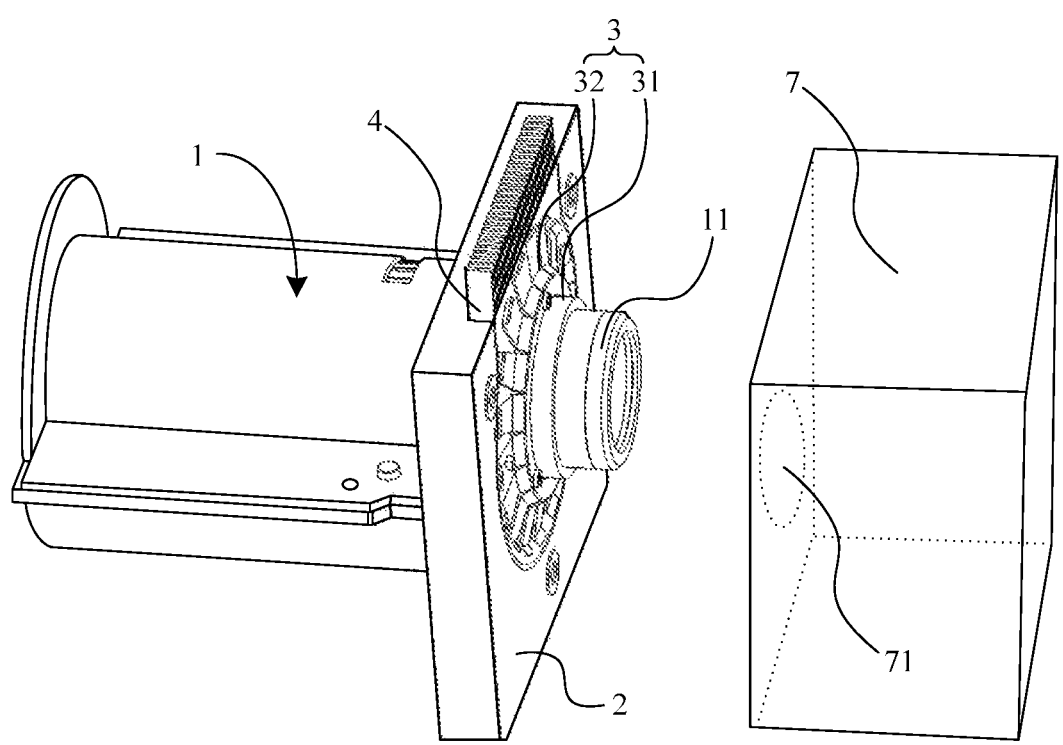
FIG. 1 is a schematic structural diagram of a projection device according to an embodiment of the present application.
Figure 2:
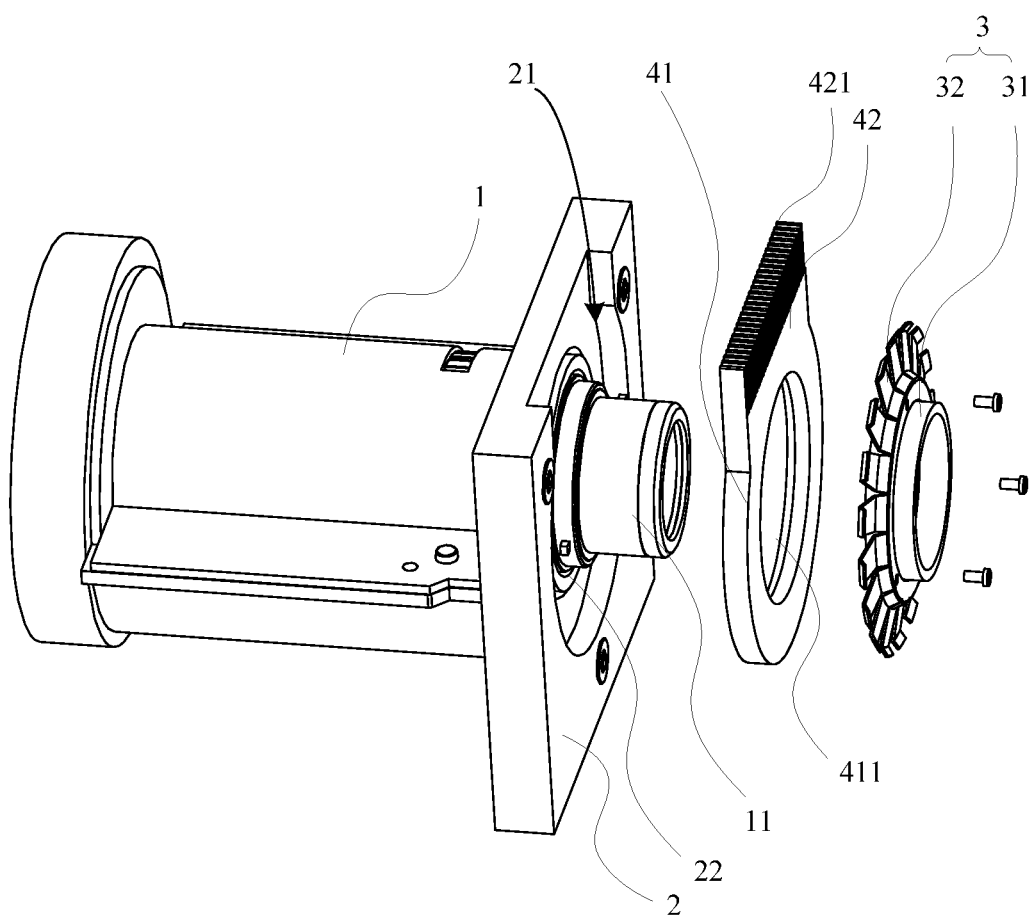
FIG. 2 is a schematic exploded diagram of a lens assembly in a projection device according to an embodiment of the present application.
Figure 3:
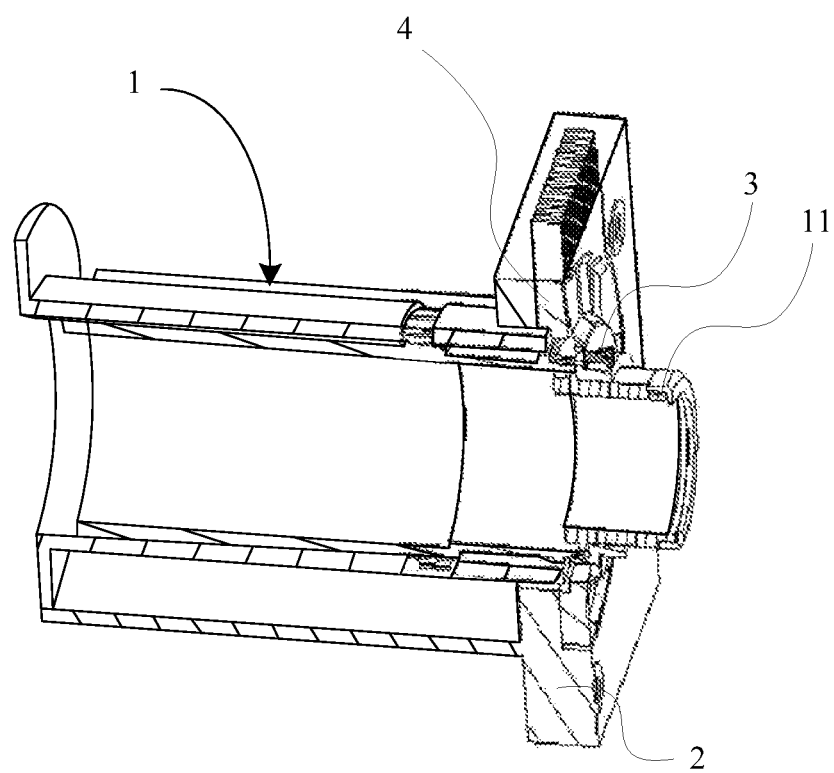
FIG. 3 is a schematic internal diagram of a lens assembly in a projection device according to an embodiment of the present application.
Figure 4:
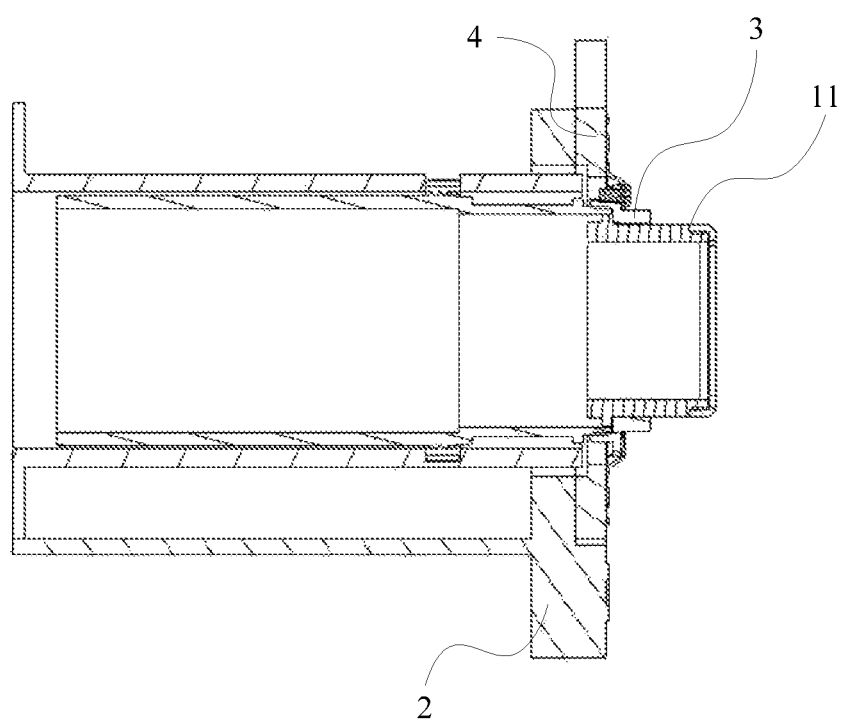
FIG. 4 is a schematic cross-sectional diagram of a lens assembly in a projection device according to an embodiment of the present application.
Figure 5:
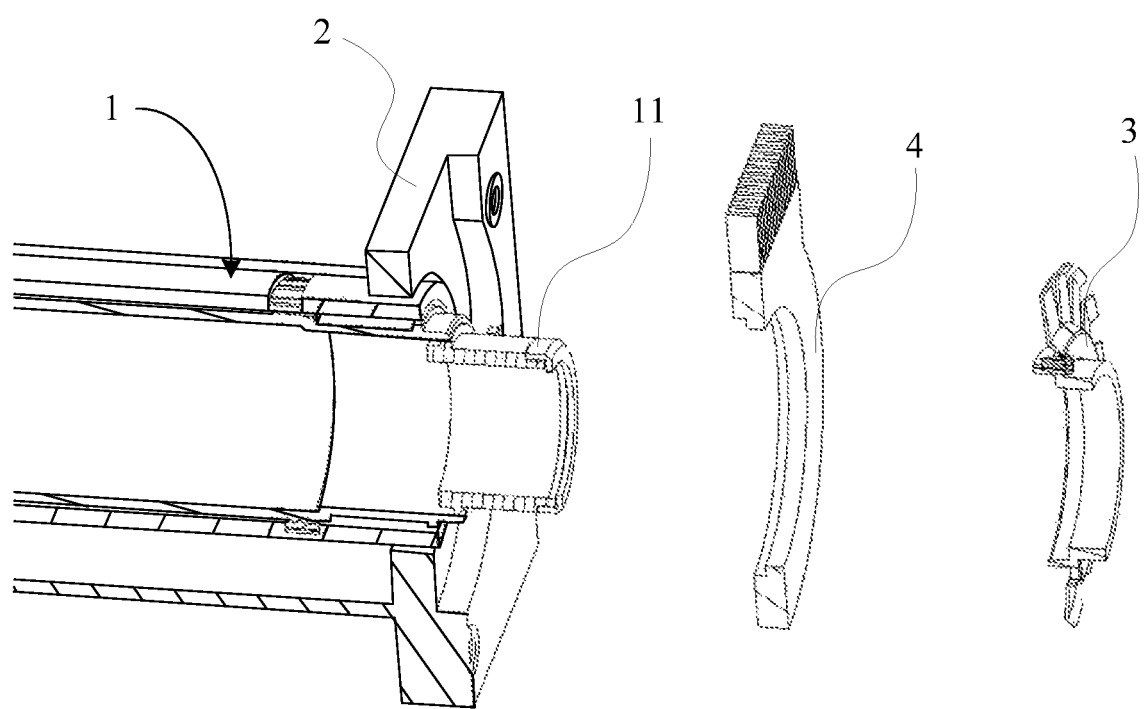
FIG. 5 is a schematic internal decomposition diagram of a lens assembly in a projection device according to an embodiment of the present application.

In order to make the objects, technical solutions and advantages of embodiments of the present application more clear, the technical solutions in the embodiments of the present application will be clearly and completely described in combination with the drawings in the embodiments of the present application. It is apparent that the described embodiments are part of embodiments of the present application, but not all of the embodiments. All other embodiments obtained by those skilled in the art based on the embodiments of the present application without any creative effort are within the protection scope of the present application.

As shown in FIG. 1 to FIG. 5, a projection device provided by an embodiment of the present application includes a lens assembly 1 and a first housing 7, and the lens assembly 1 includes a lens barrel 11 and a thermal transfer assembly 3 disposed on an outer wall of the lens barrel 11. A DMD element (not shown) is disposed in the first housing 7, and a first through hole 71 is disposed on a sidewall of the first housing 7 corresponding to the lens assembly 1. One end of the lens barrel 11 is configured to go deep into the first housing 7 via the through hole 71, to allow the lens assembly 1 to receive light emitted from the DMD element. In some embodiments, the thermal transfer assembly 3 is disposed close to one end of the lens barrel 11 that goes deep into the first housing 7, and the thermal transfer assembly 3 includes a first thermal transfer structure 31 and a second thermal transfer structure 32. The first thermal transfer structure 31 is disposed on the outer wall of the lens barrel 11, one end of the second thermal transfer structure 32 is connected to the first thermal transfer structure 31, and the other end of the second thermal transfer structure 32 extends in a direction away from the axial direction of the lens barrel 11.

In some embodiments, the first thermal transfer structure 31 is disposed between the outer wall of the lens barrel 11 and a hole wall of the first through hole 71.

In some embodiments, the first thermal transfer structure 31 is an annular structural assembly, the inner side of the first thermal transfer structure 31 is connected to the outer wall of the lens barrel 11, and the second thermal transfer structure 32 is annular disposed at one end of the first thermal transfer structure 31 along a circumferential direction. In some embodiments, the second thermal transfer structure 32 is disposed at a first side of the first thermal transfer structure, and the first side of the first thermal transfer structure refers to one side of the first thermal transfer structure 31 away from the end portion of the lens barrel 11 that goes deep into the first housing 7, thereby allowing the first thermal transfer structure 31 to be disposed between the outer wall of the lens barrel 11 and the hole wall of the first through hole 71.

In some embodiments, the second thermal transfer structure 32 includes at least one thermal transfer sheet 320. One end of the at least one thermal transfer sheet 320 is connected to the first thermal transfer structure 31, and is annularly disposed at one end of the first thermal transfer structure 31 along the circumferential direction, and the other end of the at least one thermal transfer sheet 320 extends in the direction away from the axial direction of the lens barrel 11.

In some embodiments, the projection device further includes a lens base 2 for fixing the lens barrel 11. In some embodiments, the lens base 2 fixes the lens barrel 11 on the first housing 7, the thermal transfer sheet 320 is an elastic sheet, and the other end of the at least one thermal transfer sheet 320 may elastically abut against the lens base 2.

In some embodiments, the projection device further includes a first thermal dissipating assembly 4 that is sleeved and disposed at an outer side of the lens barrel 11 and locates between the lens base 2 and the at least one thermal transfer sheet 320, and the other end of the at least one thermal transfer sheet 320 may elastically abut against the first thermal dissipating assembly 4. In some embodiments, one side of the lens base 2 toward the first housing 7 defines a groove 21 surround the lens barrel 11 for housing the first thermal dissipating assembly 4. The depth of the groove 21 along the axial direction of the lens barrel 11 is substantially consistent with a thickness of the first thermal dissipating assembly 4 along the axial direction of the lens barrel 11.

In some embodiments, the first thermal dissipating assembly 4 includes a first body 41 and a first thermal dissipating portion 42. The first body 41 is an annular structure that is sleeved and disposed at the outer side of the lens barrel 11 and is accommodated in the groove 21 that is defined in the lens base 2. The first thermal dissipating portion 42 is connected to the outer side of the first body 41 and extends along the direction away from the lens barrel 11. An opening is provided in the groove 21 along a radial direction of the lens barrel 11, and the opening is configured to enable the first thermal dissipating portion 42 to protrude out of the lens base 2, that is, the first thermal dissipating portion 42 extends along the direction away from the lens barrel 11 to out of an edge of the lens base 2.

The projection device provided by the embodiment dissipates the thermal of the lens assembly 1 to the outside through the thermal transfer assembly 3, and may also transfer the thermal of the lens assembly 1 to the first thermal dissipating assembly 4 through the elastically connection between the thermal transfer assembly 3 and the first thermal dissipating assembly 4, to perform effective thermal dissipating for the lens assembly 1.

The above projection device may usually be a laser television, a projector or other device capable of image projection. In order to realize a projection of a picture, the projection device includes the lens assembly 1, the optical assembly, and the like. The optical assembly is also commonly referred to as an optical engine, therein including devices such as the digital micro-mirror device (DMD) and a front-end illumination light path. In some embodiments, the illumination light path may serve as a light source to provide light; and the DMD may enable the light emitted from the illumination light path to be selectively passed, thus forming an image picture.

In order to perform operations such as focusing, zooming and the like on the light emitted from the optical assembly to project a picture image normally displayed on the projection screen, the projection device further includes the lens assembly 1. In some embodiments, the lens assembly 1 includes multiple sets of lenses, each set of which includes one or more lenses, such that the light emitted from the optical assembly can focus on the projection screen through refraction between different lenses to display a picture normally. In some embodiments, in order to fix the lens, the lens assembly 1 further includes the lens barrel 11 such that multiple lenses may be fixed in the lens barrel 11 at preset intervals to implement imaging through the refraction of light by the lens.

Meanwhile, in order to fix the lens assembly 1, the projection device further includes the lens base 2, so that the lens assembly 1 may be disposed on the lens base 2 to achieve positioning and fixing. Generally, the lens base 2 may have a second through hole 22 for penetrated disposing the lens assembly 1, and the lens assembly 1 is integrally fixed in the second through hole 22. The lens base 2 takes its own each end surface as installation surfaces to connect to other structures.

When the projection device is working, since the light emitted from the optical assembly may be processed such as converged, refracted and the like via the lens assembly 1, the lens in the lens assembly 1 may suffer a large amount of thermal when the light penetrates. In order to prevent the lens from thermal deformation due to excessive thermal accumulation, and to prevent the image picture projected by the projection device from affection, the projection device further includes a thermal transfer assembly 3 capable of transferring thermal on the lens assembly 1 to the outside or to the lens base 2, thereby effectively reducing the thermal accumulated on the lens assembly 1, avoiding the lens of the lens assembly 1 suffering the phenomenon of thermal deformation, and ensuring normal imaging of the projection device.

In some embodiments, the projection device further includes a first thermal dissipating assembly 4, wherein the first thermal dissipating assembly 4 is generally sleeved and disposed at the outer side of the lens barrel 11 and simultaneously connected to the lens base 2. Generally, due to that the first thermal dissipating assembly 4 and the lens base 2 are mutually fixed, and when the lens assembly 1 performs the function of focusing, the lens barrel 11 will have a certain displacement along the axial direction. In order to prevent the first thermal dissipating assembly 4 from obstructing the normal focusing of the lens assembly 1, the first thermal dissipating assembly 4 is generally sleeved and disposed at the outer side of the lens barrel 11, and a certain gap is retained between the first thermal dissipating assembly 4 and the lens barrel 11, rather than that the first thermal dissipating assembly 4 directly contact the lens barrel 11. The first thermal dissipating assembly 4 connects to the lens barrel 11 through the thermal transfer assembly 3. Because the thermal transfer sheet in the thermal transfer assembly can provide a certain space for a relative movement between the first thermal dissipating assembly 4 and the thermal transfer assembly 3 through deformation, so that the lens barrel 11 can freely move backward and forward, and simultaneously transfer thermal to the first thermal dissipating assembly 4 through the thermal transfer assembly 3 to achieve thermal dissipating, while the movement of the lens barrel 11 is not interfered and obstructed by the first thermal dissipating assembly 4.

In some embodiments, in order to transfer thermal on the lens barrel 11 to the first thermal dissipating assembly 4, the thermal transfer assembly 3 connected to the outer wall of the lens barrel 11 may be elastically connected to the first thermal dissipating assembly 4. Thus, the thermal on the lens barrel 11 may be transferred to the first thermal dissipating assembly 4 via the thermal transfer assembly 3. In some embodiments, there may be various implementations of the elastic connection between the thermal transfer assembly 3 and the first thermal dissipating assembly 4. For example, the connection between the two may be achieved by utilizing various elastic structures, such that the relative movement between the thermal transfer assembly 3 and the first thermal dissipating assembly 4 may be achieved by utilizing the deformation of the elastic structures, thus when the thermal transfer assembly 3 moves as the lens barrel 11 moves, the first thermal dissipating assembly 4 can be kept at the original position, and the contact state is always maintained between the thermal transfer assembly 3 and the first thermal dissipating assembly 4, to form a continuous thermal transfer.

In some embodiments, in order to have a good thermal transfer path, the thermal transfer assembly 3 and the first thermal dissipating assembly 4 may both be generally made of a material with a higher thermal conductivity such as metal, to increase a thermal conduction speed.

In embodiments of the present application, by providing the thermal transfer assembly 3 and the first thermal dissipating assembly 4 in the projection device, the thermal on the lens assembly 1 may be effectively dissipated to the first thermal dissipating assembly 4, thereby avoiding excessive thermal accumulation on the lens assembly 1 which affects the normal imaging of the lens, and at the same time, due to that the elastic connection is maintained between the thermal transfer assembly 3 and the first thermal dissipating assembly 4, the movement of the lens assembly 1 is not obstructed, thereby ensuring normal zooming of the lens assembly.

Since the lens assembly 1 needs to perform functions such as tuning focus, the lens in a conventional lens assembly 1 are generally divided into a plurality of groups, and the lens barrel 11 in the lens assembly 1 may include a plurality of different portions, so that the lenses in different groups may be placed in different portions of the lens barrel 11, and focusing is tuned by utilizing different portions of the lens barrel moving backward and forward along the axial direction of the lens assembly 1. Exemplarily, the lens barrel 11 in the lens assembly 1 may include different composed portions such as a front group lens barrel and a rear group lens barrel. In some embodiments, the thermal transfer assembly 3 is generally connected to the outer wall of the rear group lens barrel and the lens base 2 is fixed on the outer wall of the front group lens barrel.

In some embodiments, the front group lens barrel is generally located at the front end of the lens assembly 1, i.e., a position away from the optical assembly, and the rear group lens barrel is located at the rear end of the lens assembly 1, i.e., near one end of the optical assembly. Relatively moving backward and forward may be taken between the front group lens barrel and the rear group lens barrel along the axis of the lens assembly 1 (i.e., the optical axis direction) to change the relative distance between the lens in the front group lens barrel and the lens in the rear group lens barrel, thereby achieving the function of focusing. In some embodiments, since the rear group lens barrel is disposed close to the optical assembly, and on one hand, the lens in the rear group lens barrel is greatly affected by the illumination, and the temperature rises faster, and on the other hand, the rear group lens barrel is close to the optical assembly and is at least partially shielded by the first housing 7, the thermal therein is more difficult to dissipate. Therefore, by connecting the thermal transfer assembly 3 and the rear group lens barrel, thermal dissipating may be provided for the rear group lens barrel to avoid thermal accumulation and ensure normal imaging of the lens.

In some embodiments, in order to improve the thermal transfer efficiency with the thermal transfer assembly 3, the rear group lens barrel is usually made of metal or other materials with faster thermal conduction speed, while other portions of lens barrels may still be made of a lighter material such as plastic to reduce the overall weight of the projection device.

Figure 6:
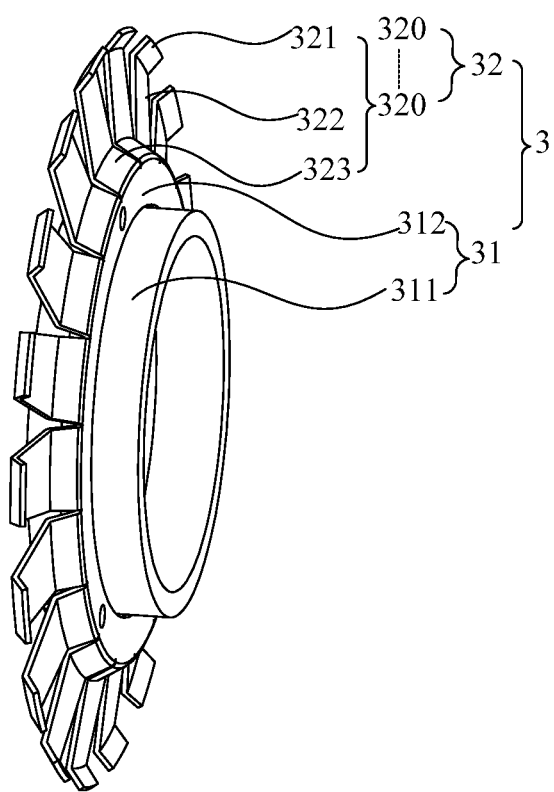
FIG. 6 is a schematic structural diagram of a thermal transfer assembly according to an embodiment of the present application.

In some embodiments, in order to connect to the outer wall of the lens barrel 11 and the first thermal dissipating assembly 4, the thermal transfer assembly 3 may have a variety of different forms and structures. FIG. 6 is a schematic structural diagram of a thermal transfer assembly according to an embodiment of the present application. As shown in FIG. 6, the thermal transfer assembly 3 includes a first thermal transfer structure 31 and a second thermal transfer structure 32. The first thermal transfer structure 31 includes a first connecting portion 311 in a cylinder shape and a second connecting portion 312 in an annular shape. The first connecting portion 311 extends along the axial direction of the lens barrel, and an inner wall of the first connecting portion 311 is connected to the outer wall of the lens barrel 11. The second connecting portion 312 extends along the radial direction of the lens barrel, and the second connecting portion 312 is disposed at one end of the first connecting portion 311 near the lens base 2. The first connecting portion 311 may be disposed between the lens barrel 11 and the hole wall of the second through hole 22. The second connecting portion 312 is disposed between the first housing 7 and the lens base 2. The second thermal transfer structure 32 includes at least one thermal transfer sheet 320. One end of each thermal transfer sheet 320 is connected to one end of the second connecting portion 312 away from the first connecting portion 311, and the other end extends in the radial direction of the lens barrel. Each thermal transfer sheet 320 includes at least a first bending portion 323 and an abutting portion 322. One end of the first bending portion 323 is connected to the second connecting portion 312, and the first bending portion 323 is bending toward the thermal dissipating assembly 4 with respect to the second connecting portion 312. The abutting portion 322 is disposed at one end of the first bending portion 323 away from the second connecting portion 312, and the abutting portion 322 is configured to abut against one side of the thermal dissipating assembly 4 toward the first housing 7, to achieve thermal conduction. The presence of the first bending portion 323 and the abutting portion 322 allows the first thermal transfer structure 31 to generate a displacement within a preset range with respect to the first thermal dissipating assembly 4, and meanwhile to perform thermal conduction. In some embodiments, each thermal transfer sheet 320 further includes a second bending portion 321 disposed at one end of the abutting portion 322 away from the first bending portion 323, and the second bending portion 321 is beneficial to the formation of the thermal transfer sheet. In some embodiments, a plane in which the abutting portion 322 is located is parallel to a plane in which the second connecting portion 312 is located.

In some embodiments, the first thermal transfer structure 31 in the thermal transfer assembly 3 may be connected to the outer wall of the lens barrel 11 to receive thermal from the outer wall of the lens barrel 11, and while at least one thermal transfer sheet 320 on the second thermal transfer structure 32 is an elastic sheet, the thermal transfer sheet may be elastically connected to the first thermal dissipating assembly 4 since it has a certain elasticity. Therefore, when a relative displacement is generated between the lens barrel 11 and the first thermal dissipating assembly 4, the second thermal transfer structure 32 will always abut against the first thermal dissipating assembly 4 relying on the elasticity of the thermal transfer sheet 320, to form a better thermal transfer contact surface with the first thermal dissipating assembly 4, so that the thermal transfer assembly 3 can transfer thermal from the lens barrel 11 to the first thermal dissipating assembly 4 through the conduction of the thermal transfer sheet 320.

In some embodiments, in order to achieve a good thermal transfer between the first thermal transfer structure 31 and the outer wall of the lens barrel 11, the first thermal transfer structure 31 may be directly in contact with the outer wall of the lens barrel 11, or may be connected to the outer wall of the lens barrel 11 by a structure such as a thermal conductive film. When a thermal conductive film exists between the first thermal transfer structure 31 of the thermal transfer assembly 3 and the outer wall of the lens barrel 11, one side of the thermal conductive film is plying-up to the outer wall of the lens barrel 11, and the other side is plying-up to the first thermal transfer structure 31, thus, it can serve as a thermal transfer medium between the lens barrel 11 and the first thermal transfer structure 31 of the thermal transfer assembly 3.

In some embodiments, the thermal conductive film may be in a variety of forms and may have a variety of structures. For example, the thermal conductive film may be a graphite thermal conductive film made of graphite, or may be a component of film shape and made of other materials that are easier for thermal conduction. Since the thermal conductive film has better thermal conduction speed and thermal conduction efficiency, the thermal conductive film is disposed between the outer wall of the lens barrel 11 and the first thermal transfer structure 31 of the thermal transfer assembly 3, which may improve the thermal transfer effect of the thermal transfer assembly 3 to the lens barrel 11.

In some embodiments, the lens barrel 11 and the first thermal transfer structure 31 may be coated with a thermal conductive adhesive or attached with a thermal conductive paste or the like, so that a stable and reliable thermal conduction path may be formed between the lens barrel 11 and the first thermal transfer structure 31, which facilitates the thermal conduction to improve thermal conduction efficiency between the lens barrel 11 and the first thermal transfer structure 31. In some embodiments, in order to be connected and fixed with the outer wall of the lens barrel 11, the first thermal transfer structure 31 may be in a cylinder shape, and the diameter of an inner edge of the first thermal transfer structure 31 matches with the diameter of the outer wall of the lens barrel 11, which enables the first thermal transfer structure 31 of the thermal transfer assembly 3 to be sleeved and disposed on the outer wall of the lens barrel 11.

In some embodiments, the first thermal transfer structure 31 may be directly connected to the lens barrel 11. The first thermal transfer structure 31 may be sleeved and disposed on the outer side of the outer wall of the lens barrel 11 from the circumferential direction, and since the diameter of the inner edge of the first thermal transfer structure 31 matches with the diameter of the outer wall of the lens barrel 11, a reliable relative fixation, relying on the match of the size, may be implemented between the thermal transfer structure 31 and the lens barrel 11, and the inner edge of the first thermal transfer structure 31 may contact with the outer wall of the lens barrel 11 well. Thus, the thermal released by the lens barrel 11 while the projection device is working may be transferred to the first thermal transfer structure 31 through the inner edge of the first thermal transfer structure 31.

In some embodiments, a structure for mutually fixing may be disposed between the lens barrel 11 and the first thermal transfer structure 31. For example, a bayonet and a groove that may be matched with each other or the like may be disposed on the lens barrel 11 or the first thermal transfer structure 31 to install the first thermal transfer structure 31 on a specified position of the lens barrel 11.

In some embodiments, the first thermal transfer structure 31 may be an annular structure that may be a single part or may be composed of a plurality of parts. When the first thermal transfer structure 31 is composed of a plurality of parts, the first thermal transfer structure 31 may be composed of at least one sector annular structure. In some embodiments, the first thermal transfer structure 31 may be composed of two semi-annular structures or more than two sector annular structures. When two or more annular structures are joined to each other, a complete first thermal transfer structure 31 in an annular shape may be collectively formed. In some embodiments, when the semi-annular structures are joined, since the shape of each structure is a section of circular arc of a circular ring, end portions of the semi-annular structures may be butted against each other, thereby forming a complete circular ring together. Thus, by means of a plurality of parts collectively constituting the first thermal transfer structure 31 of the thermal transfer assembly 3, the first thermal transfer structure 31 is disposed surround the outer side of the lens barrel 11 from an lateral side of the lens barrel 11 by joining the plurality of structures mutually when the structural size of an end portion of the lens barrel 11 is too large, thereby complete a normal assembly of the first thermal transfer structure 31.

In some embodiments, when the first thermal transfer structure 31 of the thermal transfer assembly 3 includes a plurality of semi-annular structures, the plurality of structures may be connected by a snapping connection or may be connected by a threading connection through a threading fastener. Taking that a plurality of structures are connected by a threading connection as an example, both ends of each structure may be provided with a positioning hole, where the positioning hole may be an optical hole or a threading hole. After the two adjacent structures are joined together, the threading fasteners are inserted and screwed through the positioning holes, thereby fixing the different structures together. In order to form a good thermal conduction contact between the thermal transfer assembly 3 and the first thermal dissipating assembly 4, in some embodiments, similarly, the second thermal transfer structure 32 on the thermal transfer assembly 3 may be a single part, or may be composed of a plurality of structures that circumferentially disposed surround the outer side of the first thermal transfer structure 31. The second thermal transfer structure 32 is disposed on each direction of the circumferential direction of the first thermal transfer structure 31, so that each portion of the first thermal transfer structure 31 on different directions of the circumferential direction can transfer its own thermal to the first thermal dissipating assembly 4 through the adjacent second thermal transfer structure 32, which accelerates the thermal conduction speed between the thermal transfer assembly 3 and the first thermal dissipating assembly 4, and between the thermal transfer assembly 3 and the outer wall of the lens barrel 11, thereby realizing better thermal conduction efficiency.

In some embodiments, so as to implement an elastic connection or an elastic contact with the first thermal dissipating assembly 4, the second thermal transfer structure 32 may have a variety of different structures and may be in a variety of different forms. In an embodiment, the second thermal transfer structure 32 includes at least one thermal transfer sheet, and the thermal transfer sheet may be an elastic sheet, and one end of the elastic sheet may be connected to the first thermal transfer structure 31, and the other end may abut against the first thermal dissipating assembly 4.

In some embodiments, the elastic sheet is typically made of a material such as spring steel and can generally be bent into different shapes. In this way, when the elastic sheet is pressed, the elastic potential energy may be stored by using its own deformation, and the elastic force may be used to achieve abutting against other parts. In some embodiments, one end of the elastic sheet is connected to the first thermal transfer structure 31, and the other end may be tightly abutted against the first thermal dissipating assembly 4 by the elastic force of the elastic sheet itself to realize a reliable contact connection with the first thermal dissipating assembly 4. In some embodiments, the shape of the elastic sheet may have different types such as a jaw type, or a wave type or the like.

Since the elastic sheet has a flat-shaped and sheet-like structure, when the elastic sheet abuts against the first thermal dissipating assembly 4, the flat surface of the end portion of the elastic sheet may contact the first thermal dissipating assembly 4, thereby forming a contact surface with a larger area. Thus, the contact part between the elastic sheet and the first thermal dissipating assembly 4 has a larger thermal transfer surface, which can accelerate the thermal conduction speed between the first thermal transfer structure 31 and the thermal dissipating assembly 4, and improve the thermal transfer efficiency of the thermal transfer assembly 3.

In the present embodiment, the elastic sheet may be more than one, and a plurality of elastic sheets are surrounded at the outer side of the first thermal transfer structure 31 along an axial direction. Since one end of the elastic sheet is directly connected to the first thermal transfer structure 31, and the other end of the elastic sheet is abutted against the first thermal dissipating assembly 4, the elastic sheet is usually radially arranged at the circumferential direction periphery of the first thermal transfer structure 31, and one end of the elastic sheet abutting against the first thermal dissipating member 4 is located at the outer side of the other end of the elastic sheet connected to the first thermal transfer structure 31.

In some embodiments, when the second thermal transfer structure 32 includes at least one elastic sheet, since the elastic sheet needs to be made of a material with higher elasticity, the second thermal transfer structure 32 and the first thermal transfer structure 31 are usually formed as split structures, and the second thermal transfer structure 32 and the first thermal transfer structure 31 may be connected by riveting, screwing or the like.

In addition, the second thermal transfer structure 32 may also be other elastic structures, such as a coil spring or a block elastic component, which is commonly used by those skilled in the art, and is not limited herein.

Since the thermal transfer assembly 3 is connected to the rear group lens barrel in the lens barrel 11, the first thermal transfer structure 31 of the thermal transfer assembly 3 move backward and forward along the axial direction of the lens assembly 1 as well, and at the same time, due to that an elastic contact is maintained between the second thermal transfer structure 32 and the first thermal dissipating assembly 4, there is a certain movement margin, which can ensure that the second thermal transfer structure 32 in the thermal transfer assembly 3 is always kept in contact with the first thermal dissipating assembly 4 when the entire structure of the rear group lens barrel is moved backward and forward during focusing, achieving the purpose of dissipating thermal and cooling of the lens assembly 1 normally when focusing.

In order to dissipate thermal for the lens barrel 11, the first thermal dissipating assembly 4 also has a variety of different structures and is in a variety of different forms. In some embodiments, the first thermal dissipating assembly 4 includes a first body 41 and a first thermal dissipating portion 42, and the first body 41 has a relief hole 411. The aperture of the relief hole 411 is larger than the outer diameter of the lens barrel 11 to make the first body 41 be sleeved and disposed on the outer side of the lens barrel 11.

The first body 41 may be taken as the main body of the first thermal dissipating assembly 4 to connect to the thermal transfer assembly 3, and receive thermal from the thermal transfer assembly 3. In order to reduce the length of the thermal transfer path, the first body 41 and the lens barrel 11 are generally kept at a shorter distance. The relief hole 411 may be defined on the first body 41, and the lens barrel 11 may be passed through the relief hole 411, thus, the first body 41 may be sleeved and disposed on the outer side of the lens barrel 11.

Through the manner that the relief hole 411 is defined on the first body 41 of the first thermal dissipating assembly 4, and that the first thermal dissipating assembly 4 is sleeved and disposed at the outer side of the lens barrel 11 by utilizing the relief hole 411, on one hand, the first body 41 may be disposed surround the lens barrel 11 along the circumferential direction, so as to correspond to the portions in respective different directions of the lens barrel 11 to enable the lens barrel 11 dissipated thermal uniformly; and on the other hand, by the first thermal dissipating assembly 4 sleeved and disposed on the outer side of the lens barrel 11, the space surround the outer side of the lens barrel 11 is sufficiently utilized, so that the structure of the thermal dissipating assembly 4 is more compact, and the internal overall space of the projection device is optimized.

In some embodiments, the aperture of the relief hole 411 is larger than the outer diameter of the lens barrel 11, such that there is a certain distance between the hole edge of the relief hole 411 and the outer wall of the lens barrel 11, thus when the projection device performs focusing, the lens barrel 11 can freely move backward or forward along the axial direction of the lens assembly 1 without interfering with the first thermal dissipating assembly 4.

When the thermal transfer assembly 3 conducts thermal on the lens barrel 11 to the first thermal dissipating portion 42, in order to allow the first thermal dissipating portion 42 to quickly release the accumulated thermal, the first thermal dissipating portion 42 should generally have a larger volume and thermal dissipating area. In some embodiments, at least a portion of the first thermal dissipating 42 extends to the outer side of the edge of the lens base 2. A part of the edge of the first thermal dissipating portion 42 may protrude from the coverage of the lens base 2 and extend to the outer side of the lens base 2. The portion of the first thermal dissipating portion 42 that extends to the outer side of the lens base 2 can achieve convective thermal exchange with the outside air, thereby accelerating its own thermal dissipating.

In some embodiments, at least the portion of the first thermal dissipating portion 42 can also extend to a position that is flush with the edge of the lens base 2. The first thermal dissipating portion 42 is not exposed from the edge of the lens base 2, and thus the conduction and release of thermal may be realized relying on the contact with the lens base 2, and the thermal on the first thermal dissipating assembly 4 is transferred to the lens base 2.

In order to fix the first thermal dissipating assembly 4, the lens base 2 may be provided with a corresponding fixing structure, such as the groove 21, which is a card slot, a placement groove or a mounting hole or the like. In this way, the first thermal dissipating assembly 4 may be fixed on the lens base 2 by means of snapping or screwing.

In some embodiments, the lens base 2 may be provided with a groove 21 that matches with the shape of the first body 41. The thermal dissipating assembly 4 may be partially or completely embedded in the groove 21, and fixed by the groove 21.

Generally, the groove 21 may be defined on an end face of a side of the lens base 2 facing the optical assembly, and a rabbet of the groove 21 faces the side of the optical assembly, such that when the first body 41 of the first thermal dissipating assembly 4 is disposed within the groove 21, the portion of the first thermal dissipating assembly 4 in the radial direction of the lens assembly 1 is limited by the groove 21, thereby being fixed and positioned.

In some embodiments, the shape of the groove 21 and the shape of the first body 41 of the first thermal dissipating assembly 4 are mutually matched, that is, the shape of the groove 21 is the same as that of the first body 41, and the size is slightly larger than that of the first body 41, such that the groove 21 may fix the first body 41 better, thereby fixing the first thermal dissipating assembly 4.

In order to further accelerate the thermal dissipating speed of the first thermal dissipating assembly 4 and improve the thermal dissipating performance of the projection device, generally, some thermal dissipating structures may be provided on the first thermal dissipating portion 42, to dissipate the thermal on the first thermal dissipating assembly 4 to the outside as soon as possible by means of increasing the thermal dissipating area or accelerating the air convection speed over the surface of the first thermal dissipating portion 42.

In some embodiments, a plurality of thermal dissipating fins 421 may be disposed on the first thermal dissipating portion 42. The plurality of fins 421 are disposed at intervals. Thus, when flowing through a gap between each fin, the outside air can perform thermal exchange with the surfaces of the fins, thereby taking away the thermal of the surfaces of the fins.

In some embodiments, when the first thermal dissipating portion 42 is provided with a thermal dissipating structure such as the thermal dissipating fins 421, the first thermal dissipating portion 42 generally extends to the outer side of the edge of the lens base 2, thereby exposing the thermal dissipating fins 421 to the outside air. Thus, a relatively efficient air convection may be performed over the surface of the thermal dissipating fins 421, thereby improving thermal dissipating efficiency.

Similarly, the first thermal dissipating portion 42 may also be configured as thermal dissipating grilles, or other passive thermal dissipating structure or the like. The thermal dissipating grilles can also increase the thermal dissipating area of the first thermal dissipating portion 42 with the outside depending on a structure such as grids provided at intervals, thereby accelerating the thermal conduction speed and improving the thermal dissipating efficiency. The specific arrangement of the thermal dissipating grilles is similar to that of the thermal dissipating fins 421, and details are not described herein again.

In some embodiments, the first thermal dissipating assembly 4 may further include an active thermal dissipating device such as a fan. The fan can blow a wind to the first thermal dissipating portion 42 and the surface of the thermal dissipating structure to accelerate the flow of the airflow on the surface of the first thermal dissipating portion 42 and improve the thermal dissipating performance.

It should be noted that the active thermal dissipating device such as the fan may be used independently or used cooperatively with a passive thermal dissipating structure such as the thermal dissipating fin 412, thereby improving the thermal dissipating speed and the thermal dissipating efficiency.

In this embodiment, the projection device includes a lens assembly, a lens base, a thermal transfer assembly, and a first thermal dissipating assembly. The lens assembly includes a lens barrel. The first thermal dissipating assembly is sleeved and disposed at the outer side of the lens barrel and connected to the lens base, and the thermal transfer assembly is disposed on the outer wall of the lens barrel and elastically connected to the first thermal dissipating assembly to transfer thermal of the lens assembly to the first thermal dissipating assembly. This can effectively dissipate the thermal on the lens assembly to the first thermal dissipating assembly, thereby avoiding excessive thermal accumulation on the lens assembly and affecting the normal imaging of the lens, and meanwhile due to maintaining an elastic connection between the thermal transfer assembly and the first thermal dissipating assembly, thus, the movement of the lens assembly is not obstructed, so that normal zooming may be ensured.

Referring to FIG. 1 to FIG. 5 too, in some embodiments, the projection device provided by the present application includes a front group lens barrel and a rear group lens barrel that are disposed along a same axis, and the front group lens barrel and the rear group lens barrel are configured to be relatively moved along the direction in which the axis extends; a first housing 7 internally provided with a digital micro-mirror device, where the first housing 7 is provided with a first through hole 71, and one end of the rear group lens barrel is configured to go deep into the first housing 7 via the first through hole 71; a lens base 2 and a first thermal dissipating assembly 4 sleeved and disposed at the outer side of the front group lens barrel, the lens base 2 and the front group lens barrel base are mutually fixed, the lens base 2 is configured to fix the front group lens barrel on the first housing 7, and the lens base 2 defines a groove 21 toward one side of the first housing 7, the first thermal dissipating assembly 4 is disposed in the groove 21; and a thermal transfer assembly 3, where the thermal transfer assembly 3 includes a first connecting portion 311 in a cylinder shape, and a second connecting portion 312 in an annular shape, a first bending portion 323 and an abutting portion 322, where the first connecting portion 311 is disposed on the outer wall of the rear group lens barrel and extends along an axial direction of the rear group lens barrel, the second connecting portion 312 is disposed at one end of the first connecting portion near the lens base, and extends along a radial direction of the lens barrel, one end of the first bending portion 323 is connected to one end of the second connecting portion 312 toward the first thermal dissipating assembly 4, and the abutting portion 322 is disposed at one end of the first bending portion 323 away from the first connecting portion 311, and the abutting portion 322 is configured to abut against the first thermal dissipating assembly 4, and one end of the first bending portion 323 away from the first connecting portion 311 is bending toward the first thermal dissipating assembly 4, so that a preset distance exists between a plane in which the abutting portion 322 is located and one end of the first bending portion 323 that connects the second connecting portion 312.

Another projection device provided by an embodiment of the present application will be described below with reference to FIG. 7 to FIG. 9.

Figure 7:
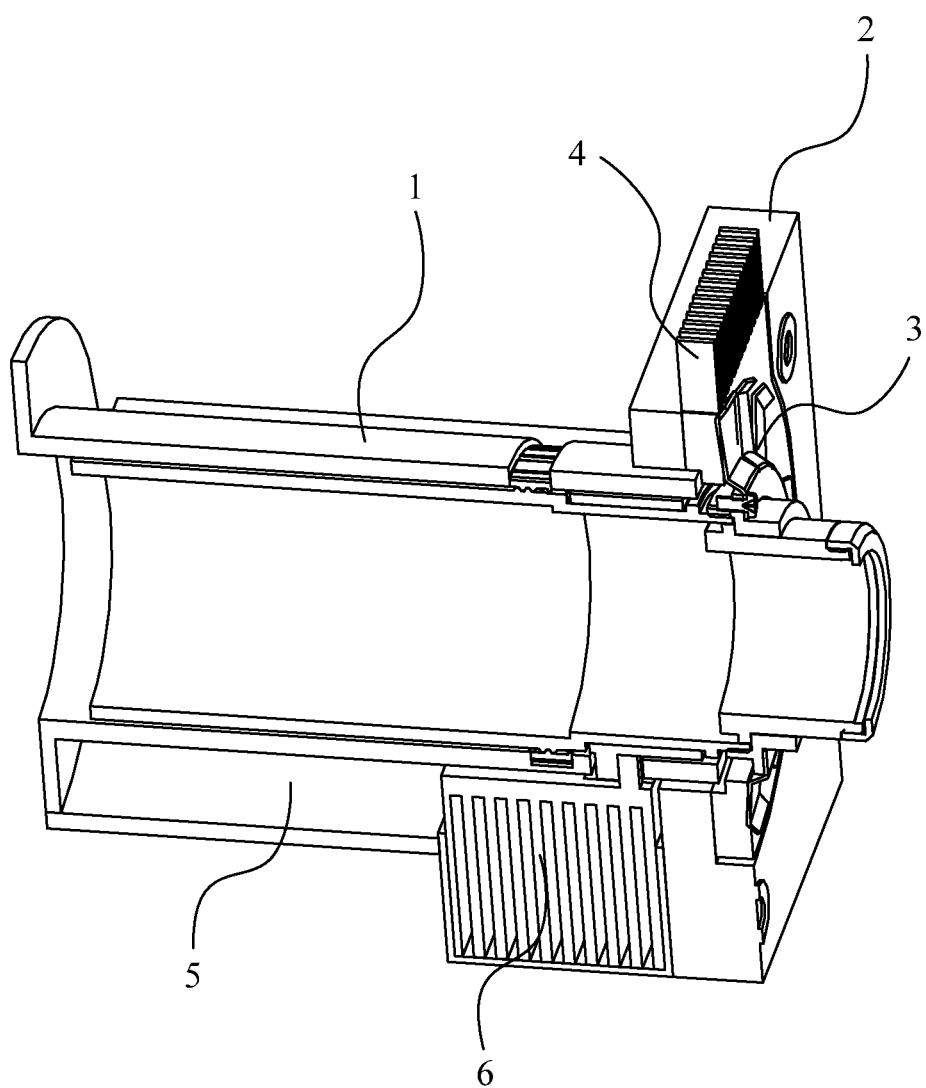
FIG. 7 is a schematic cross-sectional diagram of a lens assembly in another projection device according to an embodiment of the present application.
Figure 8:
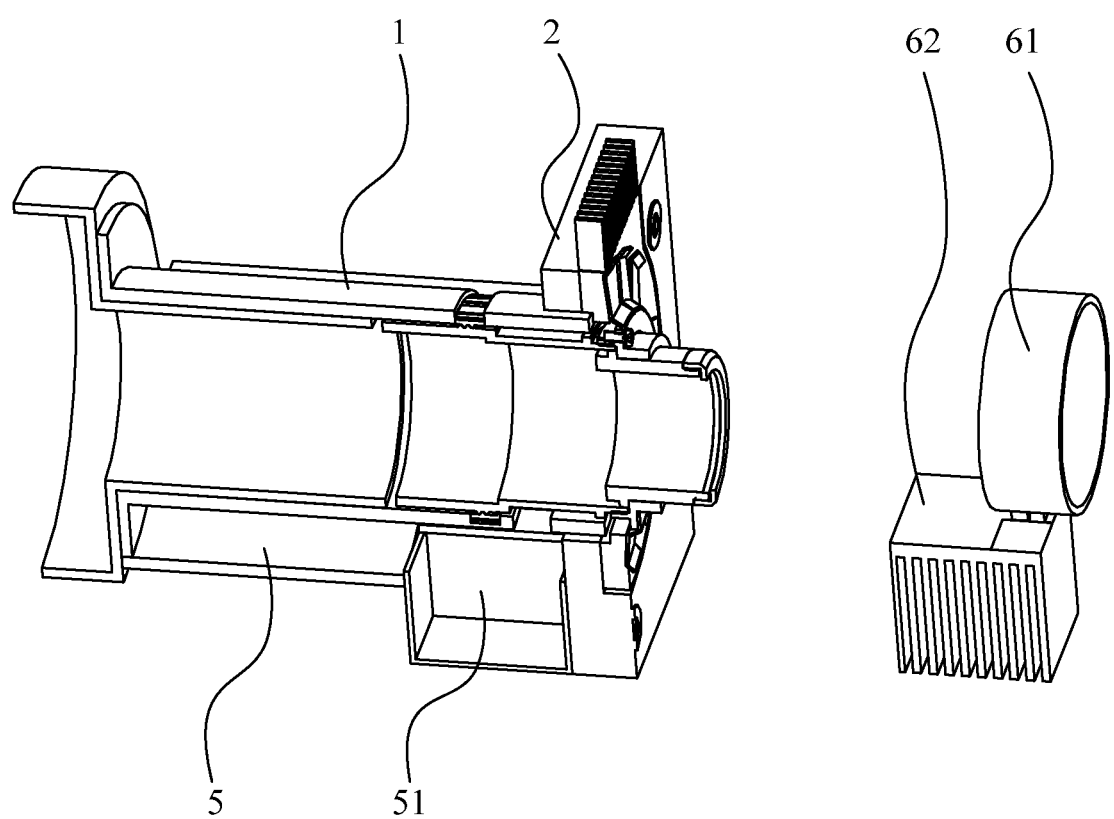
FIG. 8 is a schematic decomposition diagram of a lens assembly in another projection device according to an embodiment of the present application.
Figure 9:
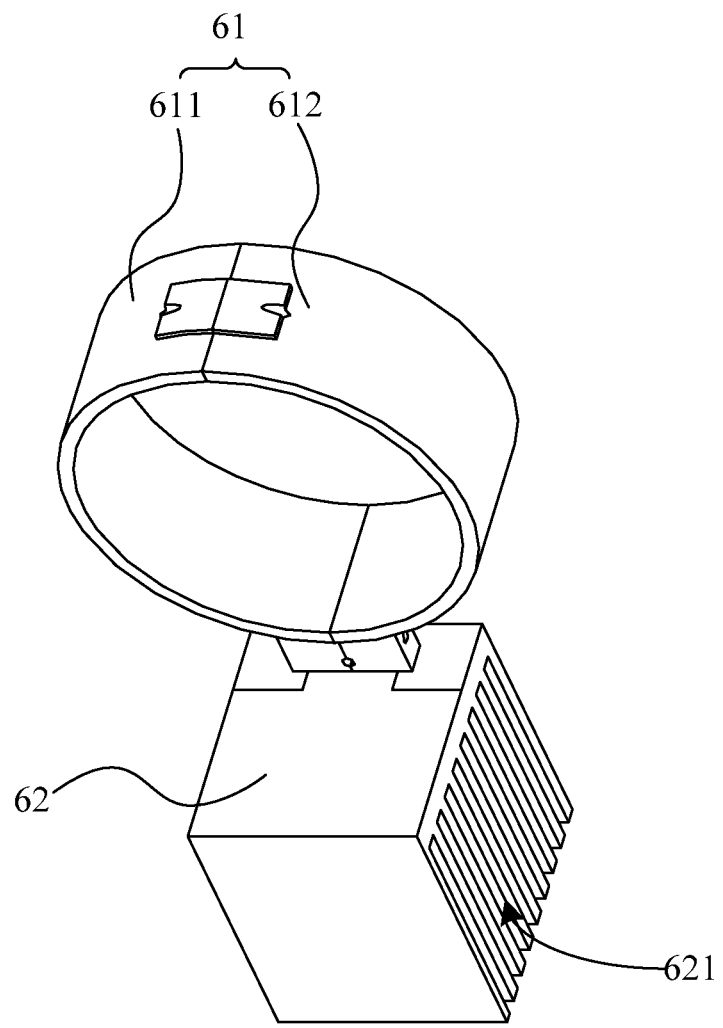
FIG. 9 is a schematic connection diagram of a thermal dissipating assembly according to an embodiment of the present application.

The projection device shown in FIG. 7 to FIG. 9 further includes an outer housing 5 and a second thermal dissipating assembly 6 as compared with the projection device shown in FIG. 1 to FIG. 5. The outer housing 5 is covering disposed at the outer side of the lens barrel 11, and the second thermal dissipating assembly 6 includes a second body 61 and a second thermal dissipating portion 62. The second body 61 is disposed on the outer wall of the lens barrel 11 and extends along the axial direction of the lens barrel, the second thermal dissipating portion 62 is connected to the outer side of the second body 61, and is accommodated in the outer housing 5 in a direction away from the lens barrel.

In some embodiments, the second body 61 and the second thermal dissipating portion 62 may be connected by any manner of the following: a snapping connection, and a threading connection.

In some embodiments, the outer housing 5 is provided with an accommodation chamber 51, the second thermal dissipating portion 62 is accommodated in the accommodation chamber 51, and there is a gap between the second thermal dissipating portion 62 and the inner wall of the accommodation chamber 51 along the axial direction of the lens barrel 11. In some embodiments, the size of the gap is determined according to a distance for focusing of the lens barrel along the axial direction. In some embodiments, the minimum distance of the gap is not less than twice the distance for focusing.

In order to protect the lens assembly 1, in general, the projection device is also provided with the outer housing 5 which is generally provided at the outer side of the lens barrel 11 in the lens assembly 1, so as to protect the lens barrel 11, meanwhile to facilitate installing and fixing other structures. Generally, a certain interval is maintained between the outer housing 5 and the lens barrel 11, and the interval may be used to accommodate other structures and components.

The second thermal dissipating assembly 6 may absorb the thermal on the lens assembly 1 by contacting the thermal transfer assembly 3 and release it to the outside, thereby effectively reducing the thermal accumulated on the lens assembly 1 and avoiding a thermal deformation phenomenon of the lens in the lens assembly 1, thereby ensuring the normal imaging of the projection device.

In some embodiments, the second thermal dissipating assembly 6 may be located between the lens barrel 11 and the outer housing 5, and the second thermal dissipating assembly 6 and the lens barrel 11 are connected to each other through the second body 61 and keep contacting well. Such that when the projection device is working, the thermal on the lens barrel 11 may be transferred to the second thermal dissipating portion 62 by means of the second body 61 performing thermal conduction, thereby achieving thermal dissipating for the lens assembly 1.

In some embodiments, the second thermal dissipating portion 62 included in the second thermal dissipating assembly 6 may include the thermal dissipating fins 621, but is not limited thereto. The second thermal dissipating portion 62 generally has a larger volume, which may be housed inside the outer housing 5 and utilize the outer housing 5 to shield and protect thereto.

In order to keep good contact with the second body 61, the second thermal dissipating portion 62 and the second body 61 are generally fixed to each other, and when the lens assembly 1 implements the function of focusing, the lens barrel 11 will generate a certain displacement backward and forward along the axial direction, thereby changing the focus position of the lens. In order to prevent the second thermal dissipating portion 62 from obstructing normal focusing of the lens assembly 1, when the second thermal dissipating portion 62 moves along the axial direction with the lens barrel 11, there is a gap between the outer housing 5 and the second thermal dissipating portion 62. Generally, the gap is a gap between the second thermal dissipating portion 62 and the outer housing 5 in the axial direction of the lens assembly 1. Thus, when the second thermal dissipating portion 62 moves correspondingly with the lens barrel 11 along the axial direction, a distance equivalent to the gap, exists as well between an extreme position of the second thermal dissipating portion 62 in the axial direction and the outer housing 5. By defining the gap, a larger space margin is reserved in the axial direction of the lens assembly 1, so that the second thermal dissipating portion 62 may be prevented from touching the wall of the outer housing 5 when the thermal dissipating portion 62 moving in accordance with the displacement of the lens barrel 11 in the axial direction. Thus, by providing the accommodating space on the outer housing 5, it is possible to prevent the outer housing 5 from obstructing the second thermal dissipating portion 62, thereby ensuring the second thermal dissipating portion 62 and the lens barrel 11 move normally when focusing.

In some embodiments, the outer housing 5 can form the accommodation chamber 51 as a special housing space for housing the second thermal dissipating portion 62 when the second thermal dissipating portion 62 moves with the lens barrel 11 along the axial direction, and the aforementioned gap exists between the portion of the thermal dissipating portion 62 housed in the accommodation chamber 51 and the outer housing 5. Since the partial structure of the second thermal dissipating portion 62 is specifically housed in the independent accommodation chamber, the outer housing 5 provides a better protection for the second thermal dissipating portion 62, thereby avoiding damaging the second thermal dissipating portion 62 or reducing thermal dissipating effect due to influence by the external environment.

In this way, by providing the second thermal dissipating portion 62 in the projection device, the thermal on the lens assembly 1 may be effectively absorbed and transferred to the outside when the projection device is working, thereby avoiding the lens being heated to deformated by excessive thermal accumulation on the lens assembly 1, and avoiding affecting the normal imaging of the lens. At the same time, since the accommodation chamber 51 capable of accommodating the second thermal dissipating portion 62 is disposed on the outer housing 5, when the second thermal dissipating portion 62 moves with the lens barrel 11 focusing, the outer housing 5 does not interfere the normal movement of the second thermal dissipating portion 62, which ensures that the projection device can zoom normally.

In some embodiments, the outer housing 5 may have a variety of different structures and may be in a variety of different forms. For example, the outer housing 5 is connected to the lens base 2. The outer housing 5, as a whole, has a cylinder shape extending in an axial direction of the optical assembly, and the end portion of the outer housing 5 is connected to the end surface of the lens base 2. Thus, the outer housing 5 may be fixed on the lens base 2. In some embodiments, the connection between the outer housing 5 and the lens base 2 may be implemented by a common connection such as snapping, screwing or riveting, and the like.

In some embodiments, the outer housing 5 may be formed directly by the lens base 2 extending in the axial direction of the lens assembly 1. The lens base 2 may partially extends in the axial direction of the lens assembly 1, and forms the outer housing 5 which is disposed surround the outer side of the lens barrel 11.

In some embodiments, the second body 61 has a cylinder shape and is sleeved and disposed on the outer wall of the lens barrel 11 for conducting the thermal on the lens barrel 11 to the second thermal dissipating portion 62, and the second thermal dissipating portion 62 is located in the accommodation chamber for conducting the thermal absorbed by itself to the outside. There is a gap between the second thermal dissipating portion 62 and the outer housing 5, so that the second thermal dissipating portion 62 can move backward and forward with the lens barrel 11 without interfering the outer housing 5.

In some embodiments, the second body 61 may be connected to the second thermal dissipating portion 62 in a plurality of different manners. For example, the second body 61 may be connected to the second thermal dissipating portion 62 by the manners such as snapping, screwing, or the like. In some embodiments, the second body 61 may generally be made of metal, or may be made of other materials that have a faster thermal conductive speed.

In order to efficiently dissipate thermal on the second thermal dissipating portion 62 to the outside, the second thermal dissipating portion 62 for dissipating thermal to the outside generally has a larger volume and a larger thermal dissipating area. The second thermal dissipating portion 62 may have different shapes and size ratios. In order to connect the second thermal dissipating portion 62 and the second body 61 of different structures together, the second thermal dissipating portion 62 and the second body 61 may be cooperated and connected with each other in a detachable manner.

In some embodiments, the second body 61 and the second thermal dissipating portion 62 are connected in a manner such as cutting grafting mutually or snapping mutually. Structures for cutting grafting or structures for snapping or the like that matches with each other may be provided between the second thermal dissipating portion 62 and the second body 61. Exemplarily, when the structures for cutting grafting that matches with each other are disposed between the second thermal dissipating portion 62 and the second body 61, a jack may be disposed on one of the second thermal dissipating portion 62 or the second body 61, and a connection column or a tenon, that may be matched to be inserted into the jack, may be disposed on the other one. Thus, when the second body 61 is installed to the second thermal dissipating portion 62, the connecting column or the tenon may be inserted into the jack, thereby completing the installing connection between the second body 61 and the second thermal dissipating portion 62.

It should be noted that when the connection between the second body 61 and the second thermal dissipating portion 62 is implemented, a larger contact area is usually needed to be kept between the second body 61 and the second thermal dissipating portion 62 to ensure that there is an expedite thermal transfer path between the second body 61 and the second thermal dissipating portion 62, so that the internal of the second thermal dissipating portion 62 may achieve a more efficient and rapid thermal transfer.

In some embodiments, some thermal conductive part or thermal conductive structure may be disposed between the second body 61 and the second thermal dissipating portion 62. For example, a thermal conductive adhesive is coated at the joint between the second body 61, or the second thermal radiating portion 62 or a thermal conductive paste is attached thereto, or the like, so that both the thermal conduction speed and the thermal conduction efficiency between the second body 61 and the second thermal dissipating portion 62 may be improved, while the normal operation of the second thermal dissipating assembly 6 may be ensured.

In order to achieve rapid thermal exchange between the second thermal dissipating portion 62 and the outside, the second thermal dissipating portion 62 may generally be made of a metal with a higher thermal conduction speed, such as copper or aluminum or the like, to increase the thermal exchange speed.

In some embodiments, for ease of installation and fixation, the second thermal dissipating portion 62 may generally be in a regular shape such as a cube or a cuboid, or the like, and have a larger volume to quickly release its own thermal to the outside. Generally, since the second thermal dissipating portion 62 generally has a larger volume and weight, the second thermal dissipating portion 62 is generally disposed at a region under the lens barrel 11, and a top end of the second thermal dissipating portion 62 is connected to the second body 61. The second thermal dissipating portion 62 approximately hang at the lower side of the lens barrel 11 by connecting to the second body 61. By setting the second thermal dissipating portion 62 in such a structure and disposing it in such a position, a gravity center of overall the second thermal dissipating assembly 62 may be lowered, thereby avoiding the phenomenon that the second body 61 is broken or damaged or the like, due to the excessive mass of the second thermal dissipating portion 62 as a whole.

In order to further increase the thermal exchange speed between the second thermal dissipating portion 62 and the outside, the second thermal dissipating portion 62 usually needs to be provided with a structure capable of increasing the outer surface area of the second thermal dissipating portion 62. In some embodiments, the second thermal dissipating portion 62 may be provided with thermal dissipating fins 621. In some embodiments, the second thermal dissipating portion 62 may also be provided with thermal dissipating grilles.

Taking that the thermal dissipating fins 621 is disposed on the second thermal dissipating portion 62 as an example, the thermal dissipating fins 621 are disposed on the outer surface of the second thermal dissipating portion 62, and includes a plurality of fins disposed at intervals. Thus, when the outside air flows through gaps between the fins, it can exchange thermal with the surface of the fins, thereby taking away the thermal of the surface of the fins. Since the total area of the surface of the fins is much larger than the surface area of the second thermal dissipating portion 62 itself, after the thermal dissipating fins 621 are disposed on the second thermal dissipating portion 62, the thermal may be dissipated to the outside more quickly, thereby avoiding the thermal accumulated on the lens assembly 1.

When the thermal dissipating fins 621 are disposed on the second thermal dissipating portion 62, the thermal dissipating fins 621 may be exposed to the outside air by means of defining a notch or the like on the outer housing 5, so that the surface of the thermal dissipating fins 621 can perform a convection with high-efficiency, which further improves the thermal dissipating efficiency.

When the thermal dissipating grilles are disposed on the second thermal dissipating portion 62, a specific arrangement manner of the thermal dissipating grilles, such as a position for disposing and the like, is similar to that of the thermal dissipating fins, and details are not described herein again.

When the lens assembly 1 works such as focuses, the lens barrel 11 moves backward and forward along the axial direction to move the focus of the lens to a proper position, and as the lens barrel 11 moves, the second body 61 fixed on the lens barrel 11 changes its location correspondingly, which further drives the second thermal dissipating portion 62 connected to the second body 61 to changes its location correspondingly too. The accommodation chamber 51 is disposed on the outer housing 5 for housing the second thermal dissipating assembly 6, which avoids that the movement of the second thermal dissipating portion 62 is obstructed by the structure of the outer housing 5. In some embodiments, there is various manners for the formation of the accommodation chamber 51, for example, a notch or other relief structures and the like is disposed directly on a position of the outer housing 5 corresponding to the second thermal dissipating portion 62, which all enable the second thermal dissipating portion 62 to move normally and smoothly.

In some embodiments, the outer housing 5 is defined with the accommodation chamber 51 extending in the axial direction of the lens assembly 1. The internal of the accommodation chamber 51 forms a housing space for accommodating and relieving the second thermal dissipating portion 62.

The accommodation chamber 51 and other portions of the outer housing 5 together may define a relatively closed housing space, and the second thermal dissipating portion 62 may be housed in the housing space. Since the second thermal dissipating portion 62 moves backward and forward along the axial direction of the lens assembly 1 with the movement of the lens barrel 11 under the driving of the second body 61, a direction of a length of the accommodation chamber 51 also extends along the axial direction of the lens assembly 1, such that there is sufficient space for the second thermal dissipating portion 62 to move. In this way, when moving, the second thermal dissipating portion 62 is not interfered and obstructed by the accommodation chamber 51, and the normal movement of the second thermal dissipating portion 62 may be ensured.

Since the direction of the length of the accommodation chamber 51 extends along the axial direction of the lens assembly 1, a size in other directions such as a width of the accommodation chamber 51 and the like may be narrower as long as the second thermal dissipating portion 62 can be housed therein, while the length of the accommodation chamber 51 is longer, so that there is enough space for the second thermal dissipating portion 62 to move.

In some embodiments, the accommodation chamber 51 may generally be in an open form or in a closed form. For example, when the accommodation chamber 51 is in a closed form, an opening of the accommodation chamber 51 may be connected to other portions of the outer housing 5, and the bottom surface of the accommodation chamber 51 is disposed away from the outer wall of the lens barrel 11. Therefore, the accommodation chamber 51 and other portions of the outer housing 5 forms a relatively closed accommodation space, which may be used for accommodating the second thermal dissipating portion 62 and provides a shielding protection for the second thermal dissipating portion 62, meanwhile, the second thermal dissipating portion 62 is allowed to freely move inside the accommodation chamber 51 along the axial direction of the lens assembly 1.

In order to give enough space along the axial direction for the second thermal dissipating portion 62 to move, in some embodiments, the minimum distance between the second thermal dissipating portion 62 and the inner wall along the axial direction of the accommodation chamber 51 may be greater than or equal to twice the distance for focusing of the lens barrel 11 along the axial direction.

In some embodiments, when the lens assembly 1 is focusing, the lens barrel 11 moves backward and forward along its own axial direction, and the distance that the lens barrel 11 deviates from the original position may be regarded as the distance for focusing of the lens barrel 11. When the lens barrel 11 moves the distance for focusing forward or backward, in order to prevent the inner wall along the axial direction of the accommodation chamber 51 from interfering the movement of the second thermal dissipating portion 62, a certain gap between the accommodation chamber 51 and the second thermal dissipating portion 62 is reserved. In some embodiments, when the second thermal dissipating portion 62 of the second thermal dissipating assembly 6 is located in the accommodation chamber 51, the minimum distance between the second thermal dissipating portion 62 and the inner wall of the accommodation chamber 51 along the axial direction may be greater than or equal to twice the distance for focusing of the lens barrel 11, so that regardless of which focusing position the lens barrel 11 of the lens assembly 1 is located, when the lens barrel 11 moves backward and forward in the focusing process, a extreme focusing position that the lens barrel 11 may be allowed to move will not exceed the distance between the edge of the second thermal dissipating portion 62 and the inner wall of the accommodation chamber 51 along the axial direction, so that the accommodation chamber 51 does not interfere or affect the movement of the second thermal dissipating portion 62, thereby enabling the lens assembly 1 to implement a normal focusing process.

The projection device provided by the embodiment of the present application transfers thermal of the lens assembly to the first thermal dissipating assembly and the second thermal dissipating assembly through the thermal transfer assembly, thereby implementing effective thermal dissipating for the lens assembly, and a normal focusing of the lens assembly may be ensured by providing an elastic connection between the first thermal dissipating assembly and the thermal transfer assembly and by providing an accommodation chamber for accommodating the second thermal dissipating assembly with an relief gap.

Another projection device provided by the embodiment of the present application includes both the first thermal dissipating assembly and the second thermal dissipating assembly. It should be understood by those skilled in the art that the projection device may also include the second thermal dissipating assembly alone.

Figure 10:
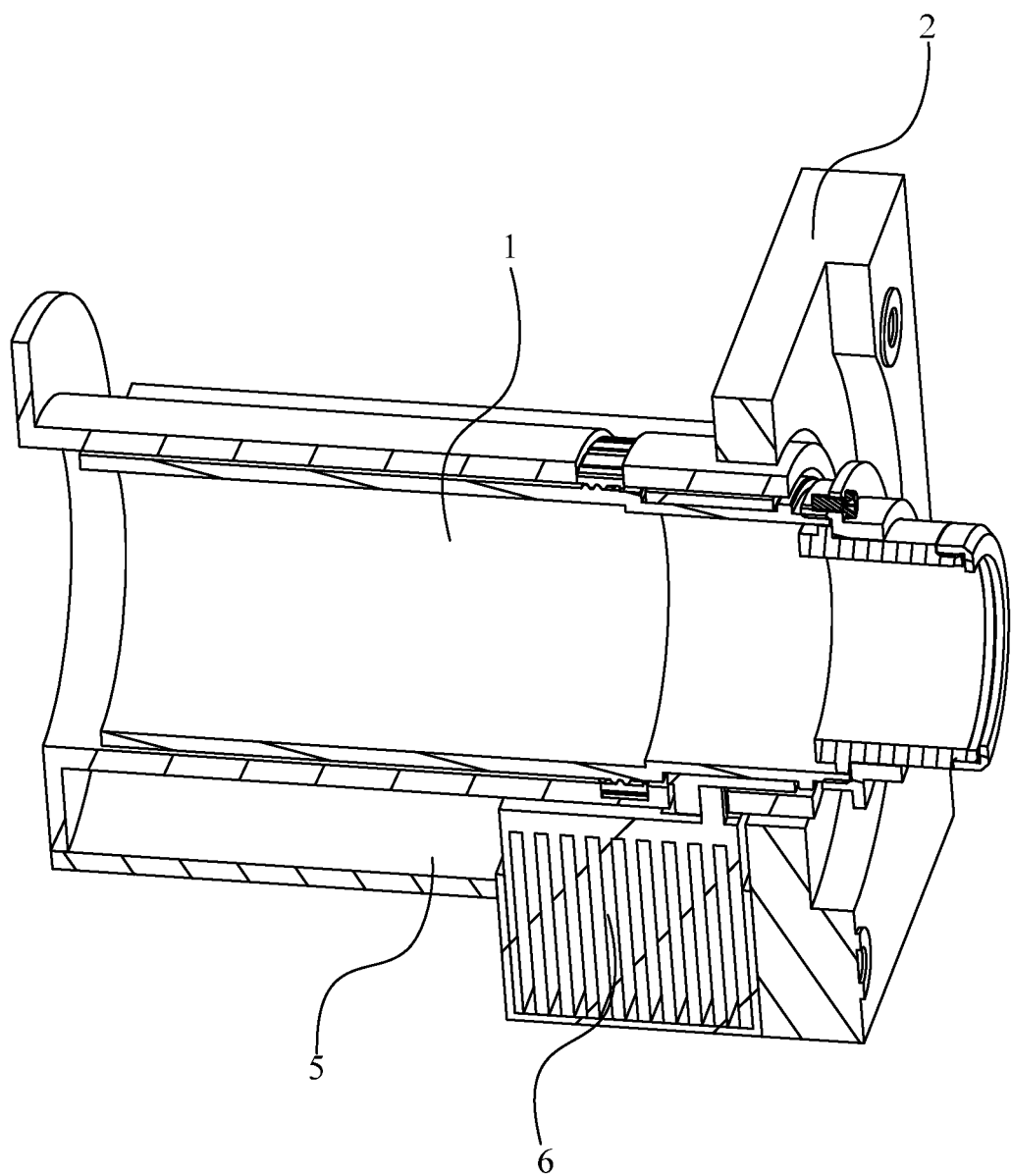
FIG. 10 is a schematic internal diagram of a lens assembly in still another projection device according to an embodiment of the present application.

Referring to FIG. 10, as compared with the foregoing embodiments of the present application, a lens assembly of a projection device shown in FIG. 10 includes a lens assembly 1, an outer housing 5, and a second thermal dissipating assembly 6. The arrangement of the second thermal dissipating assembly 6 is similar to the implementation principle and technical effect of the second thermal dissipating assembly shown in FIG. 7 to FIG. 9, and details are not described herein.

Finally, it should be noted that the above embodiments are only for illustrating the technical solutions of the present application, and are not limited thereto; although the present application has been described in detail with reference to the foregoing various embodiments, those skilled in the art should understand that: the technical solutions described in the foregoing various embodiments may still be modified, or some or all of the technical features may be equivalently substituted; and the modifications or substitutions do not make the essence of the corresponding technical solutions deviate from the scope of the technical solutions of the various embodiments of the present application.

What is claimed is:

1. A projection device, comprising: a lens barrel; and a thermal transfer assembly disposed on an outer wall of the lens barrel; and the thermal transfer assembly comprises a first thermal transfer structure and a second thermal transfer structure, the first thermal transfer structure is disposed on the outer wall of the lens barrel and extends along an axial direction of the lens barrel, one end of the second thermal transfer structure is disposed at one end of the first thermal transfer structure, and the other end of the second thermal transfer structure extends in a direction away from the axial direction of the lens barrel;

wherein the second thermal transfer structure comprises at least one thermal transfer sheet, one end of the at least one thermal transfer sheet is connected to the first thermal transfer structure, and is disposed around an outer side of the first thermal transfer structure along a circumferential direction, and the other end of the at least one thermal transfer sheet extends in a direction away from the axial direction of the lens barrel.

2. The projection device according to claim 1, wherein the first thermal transfer structure is an annular structure, an inner side of the first thermal transfer structure is connected to the outer wall of the lens barrel, and the second thermal transfer structure is disposed around the one end of the first thermal transfer structure along a circumferential direction.

3. The projection device according to claim 1, further comprising: a lens base and a first thermal dissipating assembly disposed on the lens base, wherein the thermal transfer sheet comprises a first bending portion and an abutting portion which are connected to each other, one end of the first bending portion away from the abutting portion is connected to the first thermal transfer structure, and the abutting portion abuts against the first thermal dissipating assembly.

4. The projection device according to claim 3, wherein the thermal transfer sheet further comprises a second bending portion, one end of the second bending portion is connected to the abutting portion, and the second bending portion is disposed at one end of the abutting portion away from the first bending portion, and the other end of the second bending portion away from the abutting portion bends toward a direction away from the lens base.

5. The projection device according to claim 3, wherein the lens base and the first thermal dissipating assembly are sleeved and disposed at an outer side of the lens barrel.

6. The projection device according to claim 5, wherein one side of the lens base toward the thermal transfer assembly defines a groove, and the groove is configured to fix the first thermal dissipating assembly.

7. The projection device according to claim 6, wherein the groove is provided with an opening in a radial direction of the lens barrel, and the first thermal dissipating assembly comprises a first body and a first thermal dissipating portion, wherein the first body is an annular structure, sleeved and disposed at the outer side of the lens barrel, and is accommodated in the groove defined on the lens base, and the first thermal dissipating portion is connected to an outer side of the first body, and extends along a direction away from the lens barrel through the opening.

8. The projection device according to claim 7, wherein the first thermal dissipating portion extends along the direction away from the lens barrel to outside the lens base.

9. The projection device according to claim 7, wherein the first thermal dissipating portion comprises at least one of the following thermal dissipating structures: thermal dissipating fins and thermal dissipating grilles.

10. The projection device according to claim 3, wherein the projection device further comprises an outer housing and a second thermal dissipating assembly, the outer housing is disposed at the outer side of the lens barrel, and the second thermal dissipating assembly comprises a second body and a second thermal dissipating portion, wherein the second body is disposed on the outer wall of the lens barrel and extends along the axial direction of the lens barrel, and the second thermal dissipating portion is connected to an outer side of the second body, and is accommodated in the outer housing along a direction away from the lens barrel.

11. The projection device according to claim 10, wherein the outer housing is provided with an accommodation chamber, the second thermal dissipating portion is accommodated in the accommodation chamber, and there is a gap between the second thermal dissipating portion and an inner wall of the accommodation chamber along the axial direction of the lens barrel.

12. The projection device according to claim 11, wherein a size of the gap is determined according to a distance for focusing of the lens barrel along the axial direction.

13. The projection device according to claim 12, wherein a minimum distance of the gap is greater than or equal to twice the distance for focusing.

14. The projection device according to claim 10, wherein the second thermal dissipating portion comprises at least one of the following thermal dissipating structures: thermal dissipating fins and thermal dissipating grilles.

15. The projection device according to claim 10, wherein the second body and the second thermal dissipating portion are connected by any one of the following: a snapping connection and a screwing connection.

16. The projection device according to claim 2, wherein the annular structure included in the first thermal transfer structure is composed of at least one sector annular structure, and the annular structure is formed by jointing the at least one sector annular structure by means of butting end portions of the at least one sector annular structure mutually.

17. The projection device according to claim 3, wherein the lens barrel comprises a front group lens barrel and a rear group lens barrel that are relatively movable, the lens base and the first thermal dissipating assembly are fixed to the front group lens barrel, and the thermal transfer assembly is fixed to the rear group lens barrel.

18. A projection device, comprising:
a front group lens barrel and a rear group lens barrel disposed along a same axis, wherein the front group lens barrel and the rear group lens barrel are configured to be relatively movable along a direction in which the axis extends;
a first housing provided with a digital micro-mirror device inside, wherein a first through hole is disposed on the first housing, and one end of the rear group lens barrel is configured to go deep into the first housing via the first through hole;
a lens base disposed at an outer side of the front group lens barrel and a first thermal dissipating assembly sleeved and disposed at the outer side of the front group lens barrel, wherein the lens base and the front group lens barrel are mutually fixed, the lens base is configured to fix the front group lens barrel on the first housing, one side of the lens base toward the first housing defines a groove, and the first thermal dissipating assembly is disposed in the groove; and
a thermal transfer assembly, which comprises a first connecting portion in a cylinder shape, a second connecting portion in an annular shape, a first bending portion and an abutting portion, wherein the first connecting portion is disposed on an outer wall of the lens barrel and extends along an axial direction of the rear group lens barrel, the second connecting portion is disposed at one end of the first connecting portion near the lens base and extends along a radial direction of the lens barrel, one end of the first bending portion is connected to one end of the second connecting portion toward the first thermal dissipating assembly, the abutting portion is disposed at one end of the first bending portion away from the first connecting portion, the abutting portion is configured to abut against the first thermal dissipating assembly, and one end of the first bending portion away from one end of the first connecting portion is bending toward the first thermal dissipating assembly, so that a preset distance exists between a plane in which the abutting portion is located and one end of the first bending portion that connects the second connecting portion.

19. A projection device, comprising: a lens barrel; and a thermal transfer assembly disposed on an outer wall of the lens barrel; and
the thermal transfer assembly comprises a first thermal transfer structure and a second thermal transfer structure, the first thermal transfer structure is disposed on the outer wall of the lens barrel and extends along an axial direction of the lens barrel, one end of the second thermal transfer structure is disposed at one end of the first thermal transfer structure, and the other end of the second thermal transfer structure extends in a direction away from the axial direction of the lens barrel;
wherein the first thermal transfer structure is an annular structure, an inner side of the first thermal transfer structure is connected to the outer wall of the lens barrel, and the second thermal transfer structure is disposed around the one end of the first thermal transfer structure along a circumferential direction.

20. The projection device according to claim 19, wherein the annular structure included in the first thermal transfer structure is composed of at least one sector annular structure, and the annular structure is formed by jointing the at least one sector annular structure by means of butting end portions of the at least one sector annular structure mutually.

* * * * *